United States Patent [19]
Koyahara

[11] Patent Number: 5,001,592
[45] Date of Patent: Mar. 19, 1991

[54] DISC DRIVER

[75] Inventor: Masaru Koyahara, Chichibu, Japan

[73] Assignee: Canon Denshi Kabushiki Kaisha, Chichibu, Japan

[21] Appl. No.: 414,516

[22] Filed: Sep. 29, 1989

[30] Foreign Application Priority Data

Oct. 5, 1988 [JP] Japan ................................ 63-249749
Oct. 5, 1988 [JP] Japan ................................ 63-249750

[51] Int. Cl.⁵ ............................................. G11B 17/02
[52] U.S. Cl. .................................... 360/137; 360/97.01
[58] Field of Search ............................ 360/137, 97.01

[56] References Cited

U.S. PATENT DOCUMENTS 4,636,892 1/1987 Friehauf et al. .................... 360/137
4,691,261 9/1987 Hasegawa et al. ................. 360/137
4,757,413 7/1988 Veigl ................................... 360/137
4,803,585 2/1989 Cheng ................................. 360/137

Primary Examiner—Robert S. Tupper
Attorney, Agent, or Firm—Spencer & Frank

[57] ABSTRACT

A disc driver comprises a locking plate for locking an operation button depending upon the presence or absence of an inserted magnetic disc, and a spring bridged between a tabular leg portion of the operation button and a slide lever for absorbing a shock given to the operation button locked by the locking plate and disallowing the shock to transmit to the locking plate. In place of the locking plate, a change-over lever can be employed for enabling or disabling a function of the operation button depending or the presence of absence of an inserted disc into the disc driver.

14 Claims, 10 Drawing Sheets

DISC DRIVER

BACKGROUND OF THE INVENTION

1. Field of the Invention

The present invention relates to a disc driver for recording and/or reproducing information on or from a recording medium, in particular, a disc.

2. Description of the Prior Art

A typical one of such type disc drivers is a magnetic disc driver or a floppy disc driver which is capable of recording and/or reproducing information on or from a magnetic disc consisting of a flexible magnetic recording medium, that is, a floppy disc. This magnetic disc driver is designed to clamp a magnetic disc, load a magnetic head on the magnetic disc, or eject the magnetic disc with an operation button. And, in order to prevent a magnetic disc or a magnetic head from being damaged by an erroneous operation of the operation button, the magnetic disc driver generally employs a locking mechanism for locking the operation button when the magnetic disc is not inserted into the magnetic disc driver.

The locking mechanism or some other components, however, may be damaged if an external impact is applied on the operation button being locked. In particular, if the magnetic disc driver is assembled into a portable electronic instrument, the external impact may be more often applied on the locked operation button.

Such a shortcoming may take place in optical disc drivers and magneto-optical disc drivers in addition to the magnetic disc drivers.

SUMMARY OF THE INVENTION

An object of the present invention is to provide a disc driver which is capable of overcoming such a damaging problem resulting from an erroneously-operated operation button and protecting mechanisms built in the driver from an impact applied on the operation button. Herein, the disc driver means several kinds of drivers such as a magnetic disc driver and an optical disc driver.

According to one aspect of the invention, the disc driver comprises a locking means for locking an operation button when a disc is not inserted into the disc driver, and a shock absorbing means for absorbing an impact applied on the locked operation button. This invention, therefore, makes it possible to prevent an erroneous operation of the button by the locking means and to absorb the impact applied on the locked operation button for preventing the mechanisms built in the disc driver from being damaged.

According to another aspect of the invention, the disc driver comprises a means for enabling or disabling the operation button in response to the presence or absence of a disc inserted into the disc driver itself, and a shock absorbing means for absorbing an shock applied on the operation button. This invention, therefore, makes it possible to prevent the inserted disc and the recording and/or reproducing head from being damaged by the erroneously-operated button, and to absorb and shock applied on the operation button for preventing the mechanisms built in the driver from being damaged by the shock as well, resulting in offering improved shock resistance of the disc driver.

In the first aspect of the present invention, a disc driver for recording and/or reproducing information on and/or from a disc served as a recording medium, comprises;

an operation button for operating the disc driver;

locking means for locking the operation button when the disc is not inserted to the disc driver;

lock-releasing means for releasing the lock accompanying with insertion of the disc; and absorbing means for absorbing a shock given to the operation button being locked by the locking means so as to inhibit the shock to be conveyed to the locking means.

Here, the absorbing means may comprise;

a leg portion extended at the lower end of the operation button;

a sliding member being allowed to move with the leg portion for operating the disc driver in an unlocked state of the locking means and being disallowed to move with the locking means in a locked state thereof; and an elastic member bridged between the leg portion and the sliding member for absorbing a shock.

The absorbing means may comprise;

a sliding member may be allowed to move with the movement of the operation button for operating the disc driver in an unlocked state of the locking means and being disallowed to move with the locking means in a locked state thereof;

a load member for providing a constant load to the sliding member under operation; and the sliding member further comprising at least one of an escape groove, a concave surface, and a curved surface formed on a peripheral surface of the sliding member facing to the locking means for allowing necessary displacement of the sliding member resulting from the shock.

The load member may comprise;

an elastic member having a leg portion fixed on the sliding member and a head portion removably engaging with a part of the locking means.

The disc may be either one of a magnetic disc, an optical disc, and a magneto-optical disc; and the locking means serves concurrently as the locking-releasing means and consists of a locking plate to be rotated in response to insertion of the disc and a torsion coil spring returning the locking plate to a predetermined position.

The leg portion may be tabular;

the sliding member may be a tabular slide lever with an arm used for its operation; and the elastic member may be a spring.

The load member may consist of a spring.

In the second aspect of the present invention, a disc driver for recording and/or reproducing information on and/or from a disc served as a recording medium, comprises;

an operation button for operating the disc driver;

locking means for locking the operation button when the disc is not inserted to the disc driver;

lock-releasing means for releasing the lock accompanying with insertion of the disc;

a leg portion extending to the lower end of the operation button;

a sliding member being allowed to slide with the leg portion for operating the disc driver in an unlocked state of the locking means and being disallowed to slide with the locking means in a locked state thereof;

an elastic member bridged between the leg portion and the sliding member for absorbing an shock;

a load member for providing a constant load to the sliding member being slid; and the sliding member further comprising at least one of an escape groove, a concave surface, and a curved surface formed on a peripheral surface of the sliding member facing to the locking means for allowing necessary displacement of the sliding member resulting from the shock in a locked state of the operation button.

Here, the load member may comprise;

an elastic member having a leg portion fixed on the sliding member and a head portion removably engaging with a part of the locking means.

The elastic member may include in the load member consists of a flat spring.

In the third aspect of the present invention, a disc driver for recording and/or reproducing information on and/or from a disc served as a recording medium, comprises;

an operation button for operating the disc driver;

change-over means for disabling a function of the operation button when the disc is not inserted and enabling the function in response to insertion of the disc;

a sliding member having the change-over means mounted thereon and serving to transmit a force exerted on the operation button, the force being transmitted through the change-over means, to a disc-setting mechanism for setting the disc;

a leg portion extending to the lower end of the operation button and being allowed to relatively slide with respect to the sliding member; and an elastic member for providing a force to the leg portion in a reverse direction to a direction of a shock given to the operation button.

Here, the elastic member may be bridged between the leg portion of the operation button and a fixing member fixed in the disc driver.

The change-over means may be a change-over lever to be rotated in contact with the magnetic disc inserted into the disc driver.

The disc-setting mechanism may comprise a spindle for rotating the disc;

a clamp section for clamping the disc; and a head-loading section for loading a recording and/or reproducing head onto the disc in response to the operation of the operation button.

The above and other objects, effects, features and advantages of the present invention will become more apparent from the following description of embodiments thereof taken in conjunction with the accompanying drawings.

BRIEF DESCRIPTION OF THE DRAWINGS

Examples of the invention will now be more particularly described with reference to accompanying drawings in which.

DETAILED DESCRIPTION OF PREFERRED EMBODIMENTS

With reference to the appended drawings, preferred embodiments of the invention will be described in detail.

First Embodiment

FIGS. 1A to 4B illustrate the construction and function of an essential portion of a magnetic disc driver (a 5" floppy disc driver) according to a first embodiment of the invention.

In this embodiment, the magnetic disc driver serves to clamp a magnetic disc, load a magnetic head, and eject the magnetic disc with the operation of an operation button. Further, in order to protect the magnetic disc and the magnetic head from the erroneous operation of the button, the disc driver allows the operation button to be locked for disabling the clamping and head-loading operation when a magnetic disc is not inserted into the disc driver itself. Later, a description will be directed to each mechanisms of the essential portion of the embodiment related to clamping the disc, loading the head, ejecting the disc, and locking the operation button.

Figure 1A:
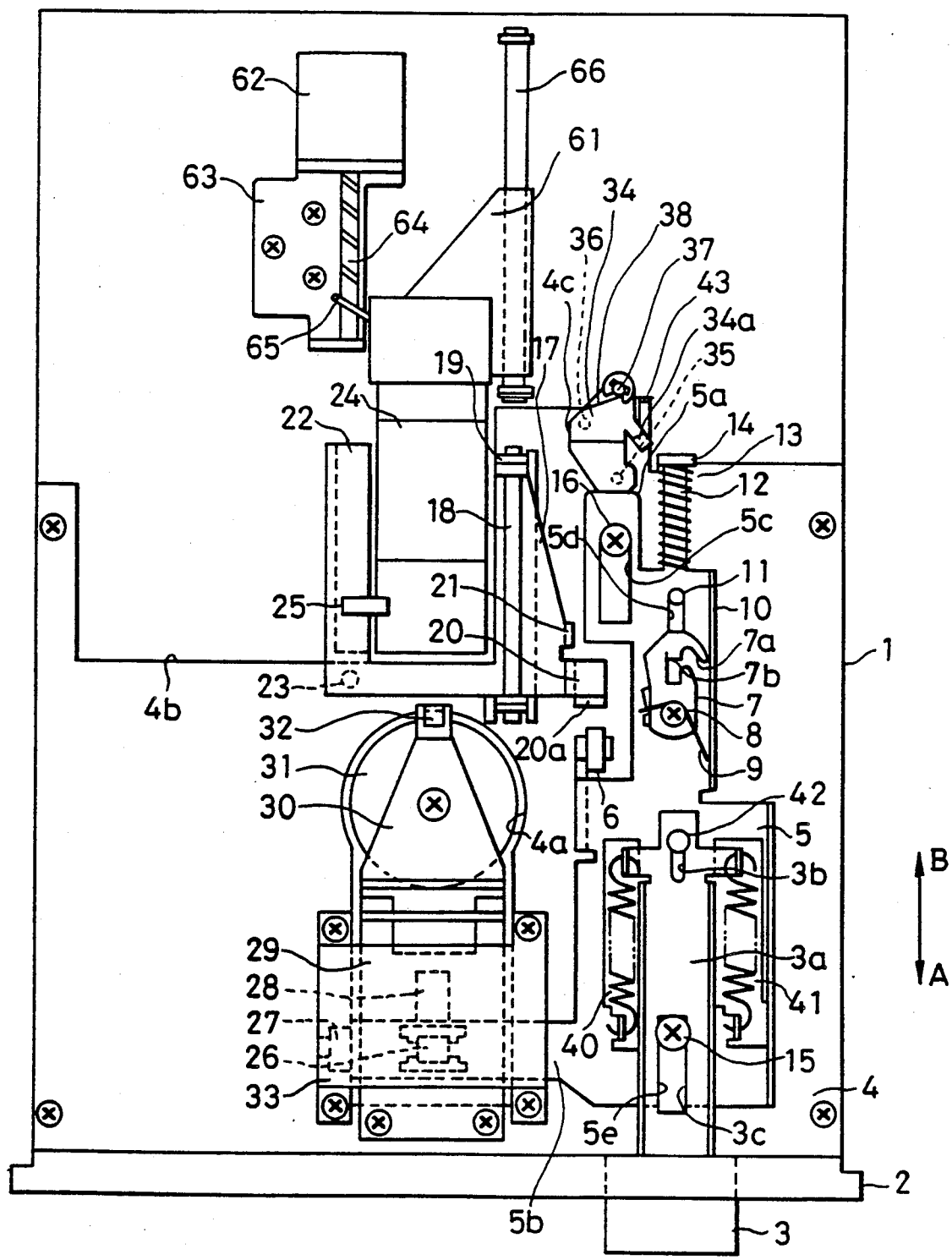
FIGS. 1A, 2A and FIGS. 1B, 2B are plan views and left side views, respectively, illustrating construction and function of an essential portion of a magnetic disc driver according to a first embodiment of the present invention.
Figure 1B:
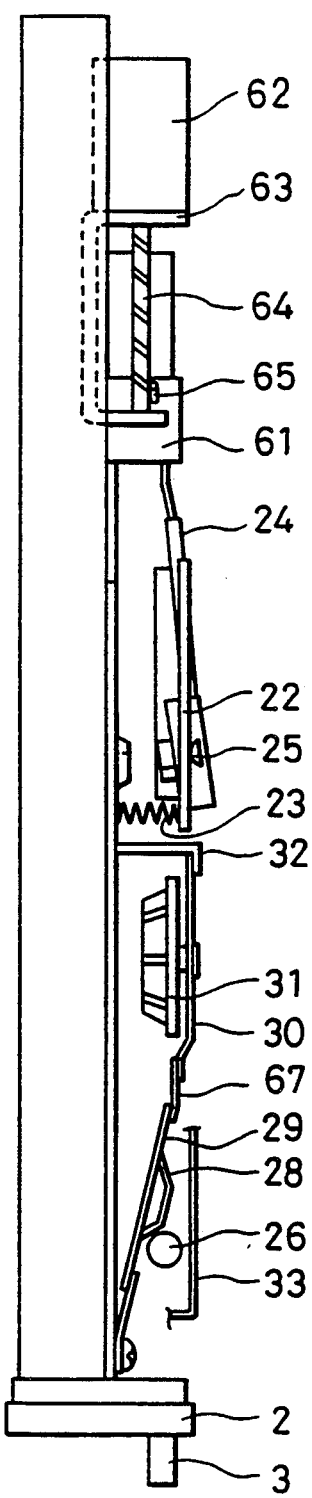
Figure 2A:
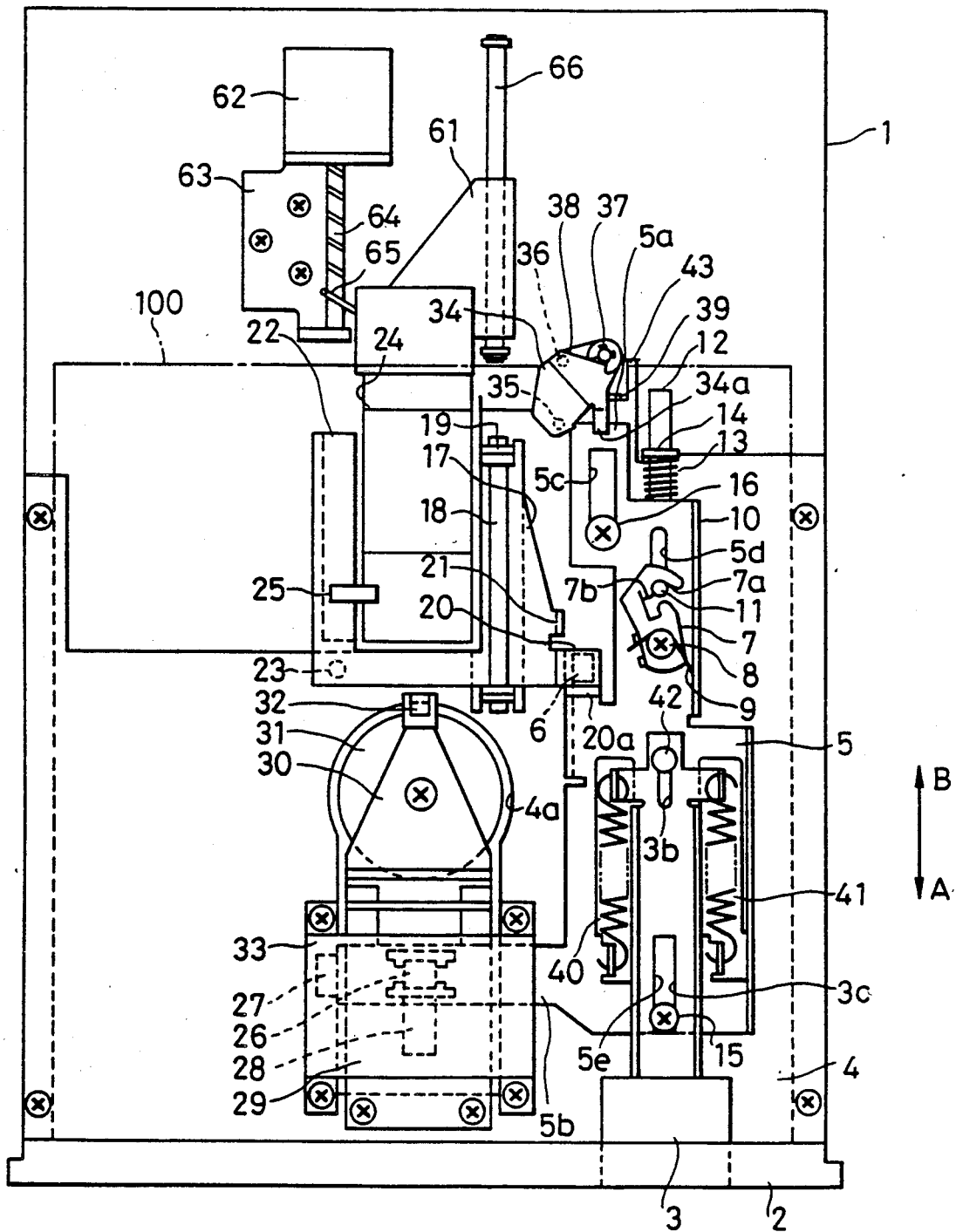
Figure 2B:
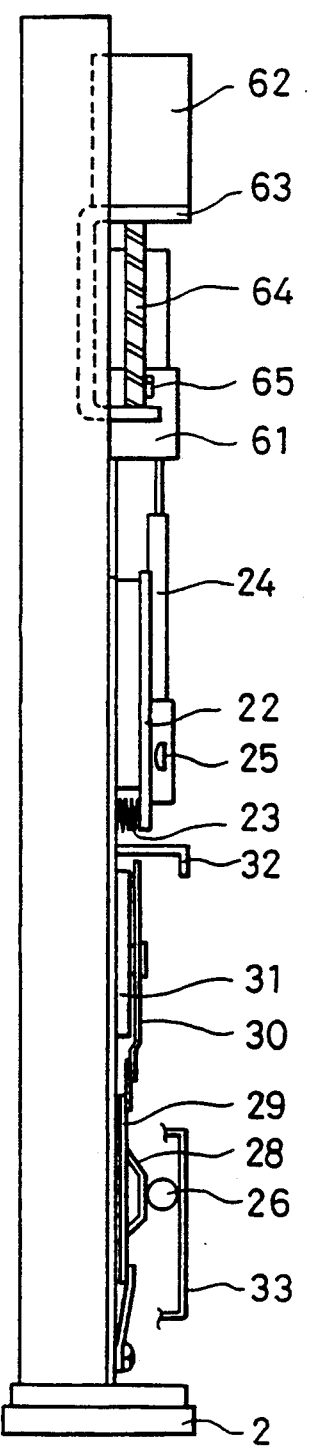

In FIGS. 1A, 1B, 2A and 2B, a base denoted by the reference numeral 1 supports an overall disc driver. The base 1 provides a front panel 2 on the front end of itself (the lower end viewed in these figures). The front panel 2 contains a disc entry (not shown) from which a magnetic disc is inserted into a position shown by a broken line 100 in FIG. 2A is then loaded. On the base 1 is fixed a base plate 4 for supporting the above-mentioned mechanisms. The magnetic disc 100 is inserted and loaded between the base 1 and the base plate 4.

The base plate 4 contains a cut-away having a circular portion 4a formed at the central thereof. In order to clamp the magnetic disc 100, a center cone 31 for rotating the magnetic disc is provided in opposition to a driving spindle (not shown) so as to be located in the circular portion 4a. The center cone 31 is rotatably mounted on a clamp arm 30. The clamp arm 30 is connected to a clamp lever 29 through a flat spring 67. The base portion of the clamp lever 29 is constructed as a flat spring and is fixed on the base plate 4 with machine screws. The center cone 31 is cantilevered by the clamp arm 30 and the clamp lever 29 so that the two flat springs bias the center core 31 upwardly. A bent portion 32 formed on the base plate 4 comes into contact with the clamp arm 30 so that the upward movement of the center cone 31 is restricted.

A head arm denoted by the reference numeral 24 is provided on a head carriage 61 for moving a magnetic head. The head carriage 61 is driven by a stepping motor 62 fixed on a fitting plate 63 through a lead screw 64 and a pin 65 engaging with the lead screw 64, and travels along a guide bar 66 in A and B directions shown by arrows in FIGS. 1A and 2A in the domains of a cut-away portion 4b formed on the base plate 4. A magnetic head is mounted on the lower surface of the head arm 24 at its distal end. The magnetic head is used for recording and/or reproducing information on or from the magnetic disc. The head arm 24 is pulled downwardly, that is, in the direction of loading the magnetic head by a spring. And, the head arm 24 has a projected piece 25 on the left edge (viewed in FIG. 1) on the upper surface.

The base plate 4 further provides a head loading lever 17 thereon for loading and unloading the magnetic head supported by the head arm 24 to and from the magnetic disc. The head-loading lever 17 is rotatably supported on a shaft 18 bridged between a pair of projected pieces 19, 19 standing on the base plate 4. On the left side (viewed in FIGS. 1A and 2A) of the head-loading lever 17 is formed a head-loading arm 22 which is pressed by the projected piece 25 of the head arm 24.

A spring 23 is provided between the lower surface of the bent portion of the head-loading arm 22 and the base plate 4. The spring 23 serves to push the head-loading arm 22 side of the head-loading lever 17 upward. On the right end of the head-loading lever 17, however, is formed a downward bent portion 21, which comes into contact with the base plate 4 so that the upward movement of the head-loading arm 22 is restricted. Further, the force of the spring 23 with which the head-loading arm 22 is pushed upward is designed to be larger than the force of the spring (not shown) with which the head arm 24 is pushed downward. Without force applied from outside, therefore, the head-loading arm 22 serves to lift up the head arm 24, resulting in allowing the magnetic head of the head arm 24 to be moved higher than a position at which it can come into contact with the magnetic disc 100.

In order to load the head with rotation of the head-loading lever 17, the head-loading lever 17 provides a bent portion 20 which is L-shaped and standing upright on the right end of the lever 17 viewed in FIGS. 1A and 2A. And, the bent portion 20 provides on the front end a projected piece 20a upwardly sloping to its end for receiving a roller 6 to be described later.

A reference numeral 3 denotes an operation button, and reference numeral 5 denotes a slide lever operated by the operation button 3.

The slide lever 5 provides slots 5c, 5d and a cut-away-portion 5e formed along the A—B line. Further, by slidably engaging pins 16, 11, 15 planted on the base plate 4 with the slots 5c, 5d and the cut-away portion 5e, respectively, the slide lever 5 is allowed to slide on the base plate 4 along the A—B line. The arrow B indicates the direction toward which the operation button 3 is assumed to be pushed.

The slide lever 5 provides an arm 12 formed on the rear end. The arm 12 contains a spring 13 would up thereon. This spring 13 is elastically mounted between the base end of the arm 12 and a bent portion 14 projected on the base plate 4. With the elastic force of the spring 13, the slide lever 5 is biased toward the arrow A. The bent portion 14 contains a hole (not shown) formed to be passed through by the arm 12. As shown in FIG.

2, the arm 12 passes through the hole depending on the moving position of the slide lever 5.

On the other hand, the front end (lower end viewed in FIGS. 1A and 2A) of the slide lever 5 is connected to above-mentioned operation button 3. In the prior art, the operation button was directly fixed on the slide lever. The present embodiment, however, employs the construction of an enlarged essential portion shown in FIGS. 3A and 3B and FIGS. 4A and 4B. According to the construction, when force beyond a given limit is applied to the operation button 3, the operation button 3 is connected to the slide lever 5 at a tabular leg portion 3a in a manner to allow the operation button 3 to slide toward the arrow B. That is, since the leg portion 3a contains slots 3b, 3c formed toward the B direction, the slots 3b, 3c can slidably receive a pin 42 planted on the slide lever 5 and the pin 15 planted on the base plate 4, respectively, so that the leg portion 3a can be slidably connected to the slide lever 5 along the A—B directions.

Springs 40, 41 are respectively bridged between spring supporting members or pegs 3d, 3e projected on both sides of the leg portion 3a and spring supporting members or pegs 5f, 5g formed on the slide lever 5. The elastic force of the springs 40, 41 serves to pull the operation button 3 in the direction A with respect to the slide lever 5 through the leg portion 3a.

The spring force of the springs 40, 41 are assumed to be far larger than an amount of a load caused when the slide lever 5 is moved in the direction B by pushing the operation button 3.

When the operation button 3 receives a larger force than the spring force of the springs 40, 41 in the direction B, therefore, the operation button 3 is slid along the slide lever 5 toward the arrow B, thereby traveling the slide lever 5 through the springs 40, 41 toward the arrow B at the same time.

In order to clamp the magnetic disc, on the other hand, an arm 5b is projected on the left side (viewed in FIGS. 1A and 2A) of the front end of the slide lever 5. The arm 5b equips a rotatable roller 26 on the lower side. The roller 26 serves to roll on a projection 28 provided at the center of the top of the clamp lever 29 for pushing down the clamp lever 29, along with the travel of the slide lever 5 toward the arrow B.

A guide frame 33 is provided so as to cover the arm 5b for suppressing a lifting of the arm 5b as well as the roller 26 which is caused by virtue of reaction force of the flat spring against the pushing-down force. An additional roller 27 is rotatably provided at the end of the arm 5b. The roller 27 is in contact with the lower surface of the guide frame 33, thereby suppressing the left of the arm 5b.

The slide lever 5 contains a latch 7 on the top at the rear end thereof. The latch 7 is rotatably mounted on a shaft 8 for locking and unlocking the slide lever 5. The latch 7 is biased clockwise by a torsion coil spring 9 would on the shaft 8. When the magnetic disc 100 shown in FIG. 1A is not loaded, the force of the spring 9 brings a tip of the latch 7 in contact with a standing bent portion 10 formed on the right-hand edge viewed in FIG. 1A. On the latch 7 is formed a hook 7a and a projected piece 7b upwardly sloping toward its end. The hook 7a comes into engagement with a pin 11 standing on the base plate 4, thereby locking the slide lever 5 at the position shown in FIG. 2A.

Further, the slide lever 5 provides at its middle left side a rotatable roller 6 for loading the head. With movement of the slide lever 5 in the direction B the roller 6 creeps into under the bent portion 20 through the lower sides of the projected piece 20a of the head-loading lever 17 so that the head-loading lever 17 rotates about the shaft 18.

On the other hand, for locking the operation button 3 and ejecting the magnetic disc 100, a locking plate 34 is provided on the base plate 4 to be opposed to the projection 5a formed on the rear end of the slide lever 5. The locking plate 34 is rotatably supported on a shaft 37 planted on the base 1 and is biased counterclockwise and downward as viewed in FIG. 1A by a torsion coil spring 38. The spring 38 is elastically mounted between a spring hook 43 standing on the base plate 4 and the locking plate 34, and the middle portion of the spring 38 is would on the shaft 37.

The locking plate 34 provides pins 35, 36 planted at the end and the middle left side of the lower surface, respectively. And, the locking plate 34 also provides a projected piece 34a on the middle right side. The projected piece 34a is upwardly sloping toward the end.

Figure 3A:
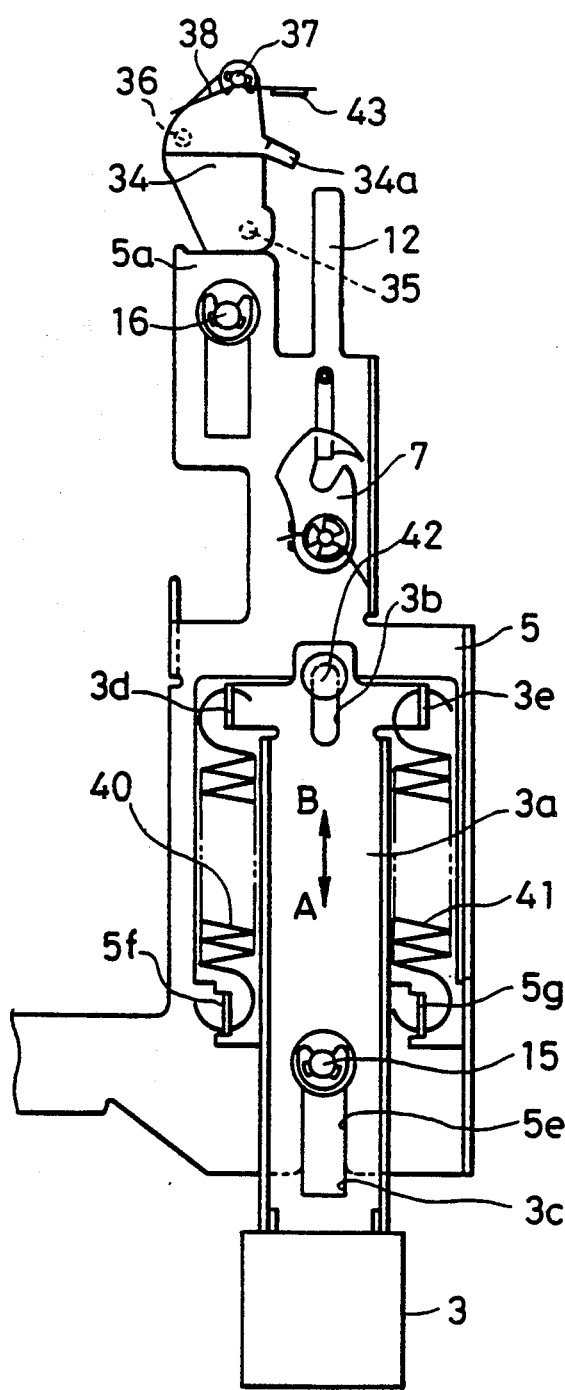
FIGS. 3A and 3B are a plan view and a right side view, respectively, showing an operation button, a slide lever and their vicinities, when the operation button is locked but receives no external impact in the disc driver of FIGS. 1A and 1B.
Figure 3B:
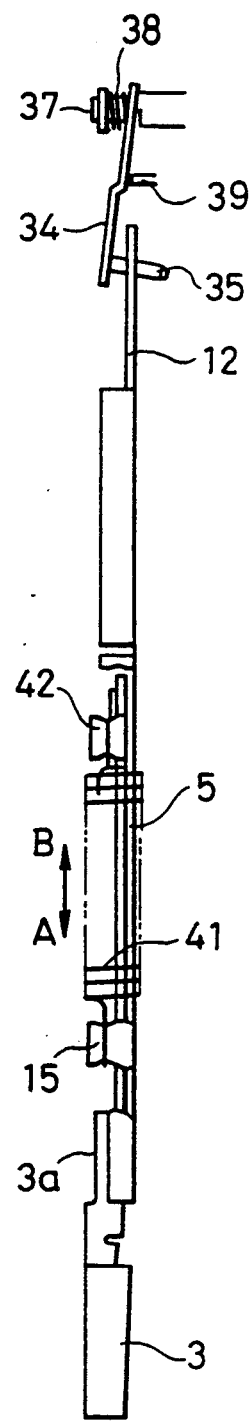
Figure 4A:
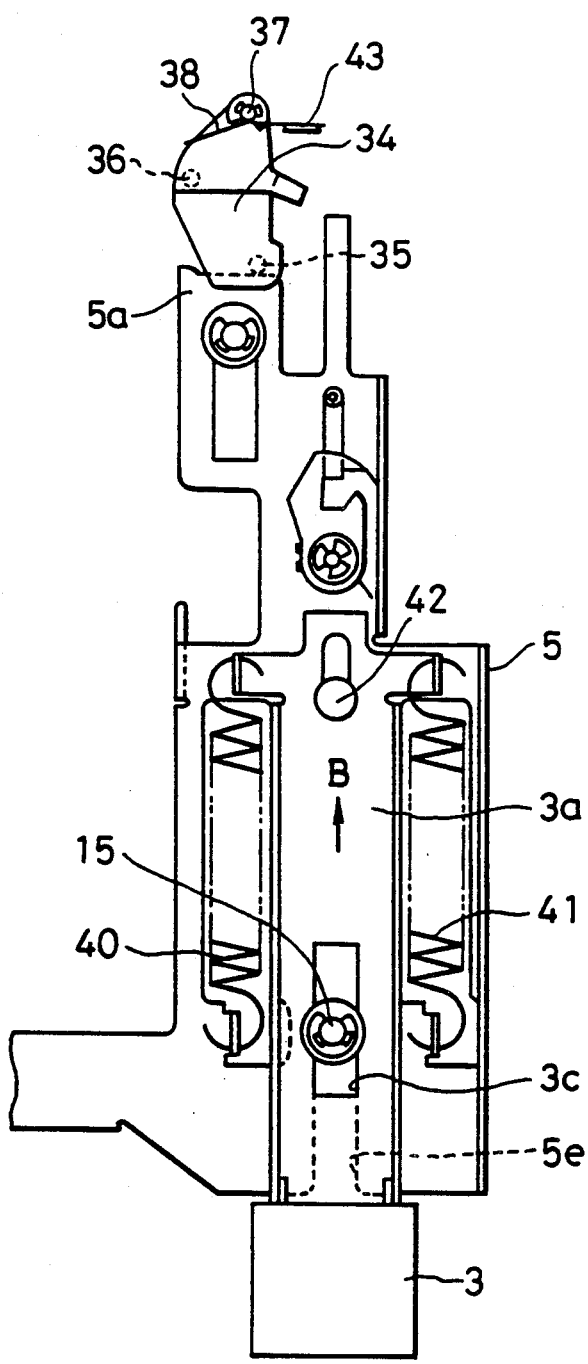
FIGS. 4A and 4B are a plan view and a right side view, respectively, showing the operation button, a slide lever and their vicinities, when the operation button receives an external impact.
Figure 4B:
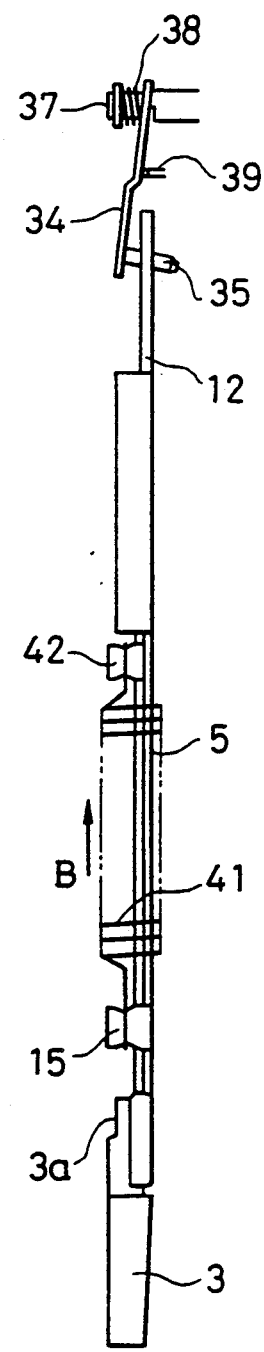

Immediately below the central portion of the locking plate 34 shown in FIG. 1A, a projection 39 is formed as shown in FIGS. 3B and 4B on the base plate 4. The project 39 contains a step formed thereon.

Further, with rotation of the locking plate 34 to the position shown in FIG. 1A, the locking plate 34 comes into contact with the projection 39 by means of the spring 38. With rotation of the locking plate 34 to the position shown in FIG. 2A, the projected piece 34a comes into engagement with the step of the projection 39.

Next, a description will be directed to the process done in response to operation of the operation button 3 in the preferred embodiment of the magnetic disc driver having the foregoing construction.

FIGS. 1A, 1B, 3A and 3B show the state where the magnetic disc is not inserted into the magnetic disc driver and the operation button 3 is not operated. In the shown state, the locking plate 34 rotates to the shown position at which the pin 35 is opposed to the projection 5a of the slide lever 5. By engaging the pin 36 with the edge of a cut-away portion 4c formed on the base plate 4, the locking plate 34 is statically locked at the shown position.

In this state, when the operation button 3 is pushed for moving the slide lever 5 in the direction B, the projection 5a of the slide lever 5 comes into contact with the pin 35, so that the slide lever 5 can not travel in the direction B. That is, the operation button 3 is clocked.

Further, in the locking state, the center cone 31 is spaced from the spindle (not shown). And, the head arm 24 is lifted up by the head-loading arm 22 through the projected piece 25 so that the magnetic head of the head arm 24 is raised at a higher position than where it can contact with the magnetic disc.

Then, from this state to a state as shown in FIGS. 2A, when the magnetic disc 100 is inserted into the right loading position, the pin 36 of the locking plate 34 is pushed by the back edge of the magnetic disc 100 toward the arrow B. As a result, the locking plate 34 rotates clockwise about the fixed shaft 37 so that the pin 35 on the locking plate 34 moves to the position away from the projection 5a of the slide lever 5. In this state, the projected piece 34a of the locking plate 34 comes into engagement with the step of the projection 39, thereby locking the locking plate 34 at its position shown in FIG. 2A. In this state, the pin 35 of the locking plate 34 is escaped from the projection 5a, so that the slide lever 5 can be moved. It means that the operation button 3 is unlocked. As described above, the operation button 3 can be unlocked when the magnetic disc 100 is inserted.

Next, by pushing the operating button 3 in the unlocked state to the position shown in FIG. 2A, the slide lever 5 is a allowed to move to the position shown in FIG. 2A Along with the movement of the slide lever 5 in the direction B, the roller 26, which is provided on the middle of the arm 5b of the slide lever 5, pushes down the projection 28 of the clamp lever 29 so as to push down the clamp lever 29 and the clamp arm 30. With this action, the center cone 31 goes down and passes through the center hole (not shown) of the magnetic disc for entering the spindle (not shown), resulting in centering of the magnetic disc, and clamping the magnetic disc between the center cone 31 and the spindle.

When the slide lever 5 further moves in the direction B from this state, the roller 6 on the slide lever 5 gets into under the projected piece 20a of the head-loading lever 17, pushes it up, and then creeps into under the bent portion 20. With this action, the right end portion of the head-loading lever 17 is pushed up and rotates about the shaft 18. Consequently, the head-loading arm 22 goes down with compression of the spring 23. Along with the lowering of the arm 22, the head arm 24 lowers in a manner to allow the magnetic head supported on the lower surface of the arm 24 to come into contact with the upper surface of the magnetic disc. It means that the magnetic head is loaded on the magnetic disc.

And, when the slide lever 5 moves toward the arrow B to the position shown in FIG. 2A, the hook 7a of the latch 7 turns around the pin 11 on the base plate 4 so that the pin 11 comes into engagement with the hook 7a of the latch 7, thereby fixing the slide lever 5 at the position shown in FIG. 2A. Namely, the slide lever 5 is locked. At this time, the foregoing functions of clamping the magnetic disc and loading the magnetic head reach a final stage. Hence, the information can be then recorded on and/or reproduced from the magnetic disc along with the rotation of it.

Next, consider when the magnetic disc is ejected upon completion of recording and/or reproduction. In the state shown FIG. 2A, with a push of the operation button 3, the slide lever 5 a bit travels in the direction B. The movement of the slide lever 5 causes the latch 7 to rotate clockwise in a manner to allow the slopped projected piece 7b biased clockwise to cap the pin 11. As a result, the latch 7 is disengaged from the pin 11 and the slide lever 5 is unlocked. And, by releasing the operation button 3, the slide lever 5 moves in the direction A with the force of the spring 13, finally the position shown in FIG. 1A.

On the other hand, by a bit moving the slide lever 5 from the position shown in FIG. 2A in the direction B as set forth above, the projection 5a of the slide lever 5 serves to push the sloped projected piece 34a, thereby pushing up the locking plate 34. With this action, the projected piece 34a formed on the locking plate 34 is disengaged from the projection 39 formed on the base plate 4, resulting in rotating the locking plate 34 counterclockwise with the force of the spring 38. And, along with the rotation, the pin 36 on the locking plate 36 serves to push the magnetic disc 100 for moving in the direction A. With the movement, the front end portion of the magnetic disc 100 exposes out of the front panel 2, thereby easily removing the magnetic disc 100. Then, after the magnetic disc 100 is removed, the present state returns to the state shown in FIGS. 1A and 1B.

Now, in the states shown in FIGS. 1A, 1B, 3A and 3B, the operation button 3 is locked as stated above. In this state, when a strong external shock is given to the operation button 3 exposed out of the front panel 2 so as to push the operation button 3 in the direction B, the springs 40, 41 are elongated so that the operation button 3 moves with respect to the stationary slide lever 5 in the direction B as shown in FIGS. 4A and 4B. That is, the springs 40, 41 serve as a cushion, thereby absorbing the shock given on the operation button 3.

The foregoing magnetic disc driver according to the preferred embodiment is capable of preventing the operation button 3 from being erroneously operated and the magnetic head or the like from any damage due to the erroneous operation, because the operation button 3 is locked and cannot be operated when the magnetic disc 100 is not inserted. That is, assuming that the magnetic head is loaded by operating the operation button 3 when the magnetic disc is not inserted, the magnetic heads may come into contact with each other, thereby doing damage to the heads. Further, assuming that the magnetic disc is clamped by operating the operation button when it is being inserted, the center hole edge of the magnetic disc may be mated between the center cone and the spindle, thereby doing damage to it. This embodiment makes sure of preventing these shortcomings.

Moreover, assuming that a strong shock is given to the operation button 3 when it is locked, this embodiment is capable of absorbing the shock through the effect of the springs 40, 41, thereby preventing a button-locking mechanism or the like from being damaged by the shock or impact without having to move the slide lever 5. Therefore, with this function, the embodiment achieves improved impact resistance and enables the disc driver to be built in a portable electronic instrument.

Figure 5:
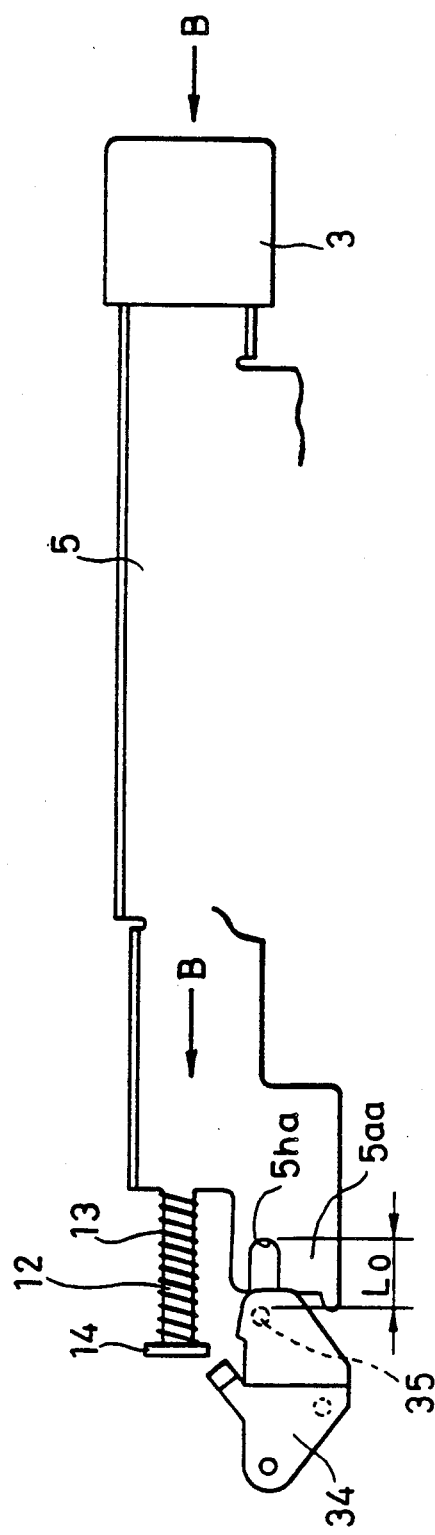
FIG. 5 is a plan view showing construction and function of a slide lever and its vicinities according to a second embodiment of the invention.

By the way, there exist another mechanisms for absorbing the shock given to the operation button 3. thereinafter, a description will be directed to another mechanisms according to the invention with reference to FIG. 5 and so forth. In these figures, like components shown in FIGS. 1A to 4B have like reference numerals, and their descriptions will be omitted.

Second Preferred Embodiment

FIG. 5 illustrates a structure of a slide lever for absorbing an shock given to an operation button used in a magnetic disc driver according to the second preferred embodiment.

As shown in FIG. 5, a different respect of this embodiment from the foregoing one is that an operation button 3 is directly and integrally fixed on the slide lever 5. The slide lever 5 has a projection 5aa with a U-shaped groove 5ha formed thereon, which is opposed to a pin 35 of a locking plate 34 for locking the locking plate itself when a magnetic disc is not inserted and the locking plate 34 is rotated to a position for locking the slide lever 5.

According to the construction above, even if a shock is given to the operation button 3 in the state shown in FIG. 5 and a B-directed pushing pressure is given thereon, the slide lever 5 is able to move in the direction B until the back edge of the groove 5ha comes into contact with the pin 35. And, while the slide lever 5 moves in the direction B, a spring 13 serves to effect an A-directed biasing force on the slide lever 5. Further, the slide lever 5 is subject to friction served as a load. With this function, the shock given to the operation button 5 is absorbed for preventing internal mechanisms from being damaged.

In other words, according to this embodiment, the slide lever 5 includes a idle distance $L_0$ between the pin 35 and the groove 5ha in the case of locking the operation button 3. This idle distance and the elastic force of the spring 13 etc. serve to above the shock given to the operation button 3.

According to the embodiment, it goes without saying that the distance $L_0$ must be long enough to avoid clamping a magnetic disc and loading the magnetic head even if the slide lever 5 moves in the direction B by the distance $L_0$.

The construction according to the embodiment permits an shock to be transmitted to the locking plate 34 when the bottom of the groove 5ha comes into contact with the pin 35. It therefore has a less effective absorbing function than the first embodiment, but has a very simple mechanism for absorbing the shock. It can be thus made at lower cost.

Third Embodiment

Figure 6:
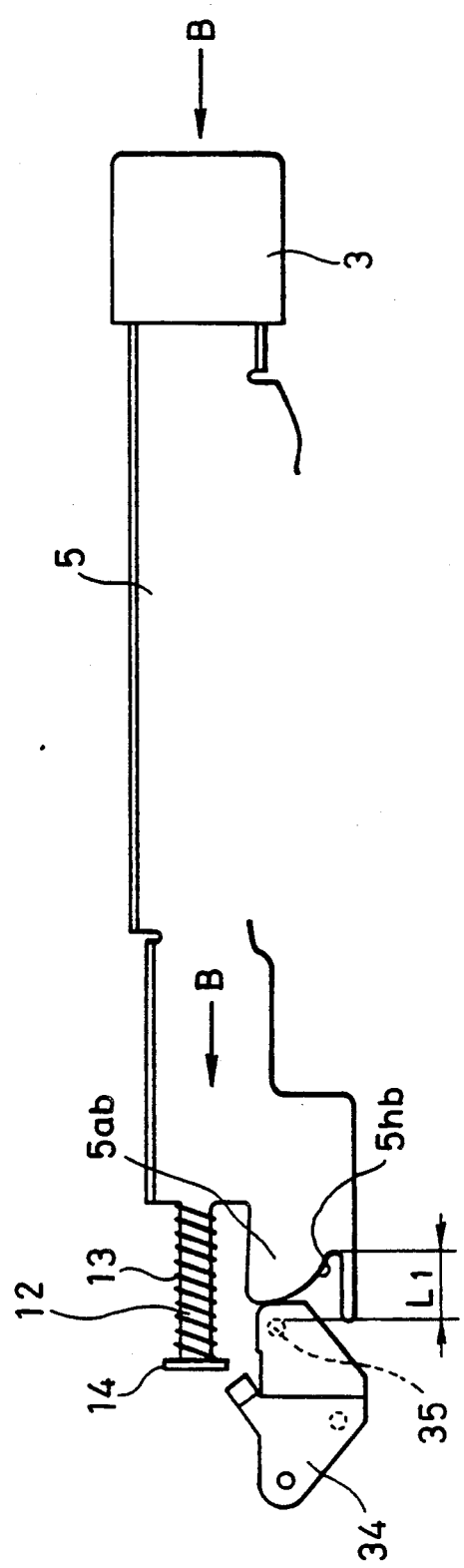
FIG. 6 is a plan view showing a slide lever and its vicinities according to a third embodiment of the invention.

FIG. 6 shows a construction of a slide lever 5 used in the third embodiment of the invention. This embodiment has a modified construction of the second embodiment of the invention shown in FIG. 5. As shown in FIG. 6, a groove 5hb formed on a projection 5ab of the slide lever 5 is shaped in the form of a substantially V-character. In the above construction, when a shock is given to the operation button 3 in a manner to push the slide lever 5 in the direction B, the slide lever 5 slides in the direction B, resulting in allowing a sloped edge of the groove 5hb to come into contact with the pin 35 on the locking plate 34. Then, because the groove 5hb has the sloped edge, the pin 35 is pushed downward in FIG. 6, thereby rotating the locking plate 34 clockwise. And, depending on an shock level, the slide lever 5 can move to the position until the innermost edge of the groove 5hb comes into contact with the pin 35, that is, as far as a distance $L_1$. The shock given to the operation button 3 is absorbed by a load such as the A-directed force of the of the spring 13 effected during the movement of the slide lever 5.

According to the construction of the embodiment, therefore, the locking load of the operation button 3 can be larger than the second embodiment. In addition, the locking load can be variably set depending on a sloped angle of the edge of the groove 5hb.

Fourth Embodiment

Figure 7A:
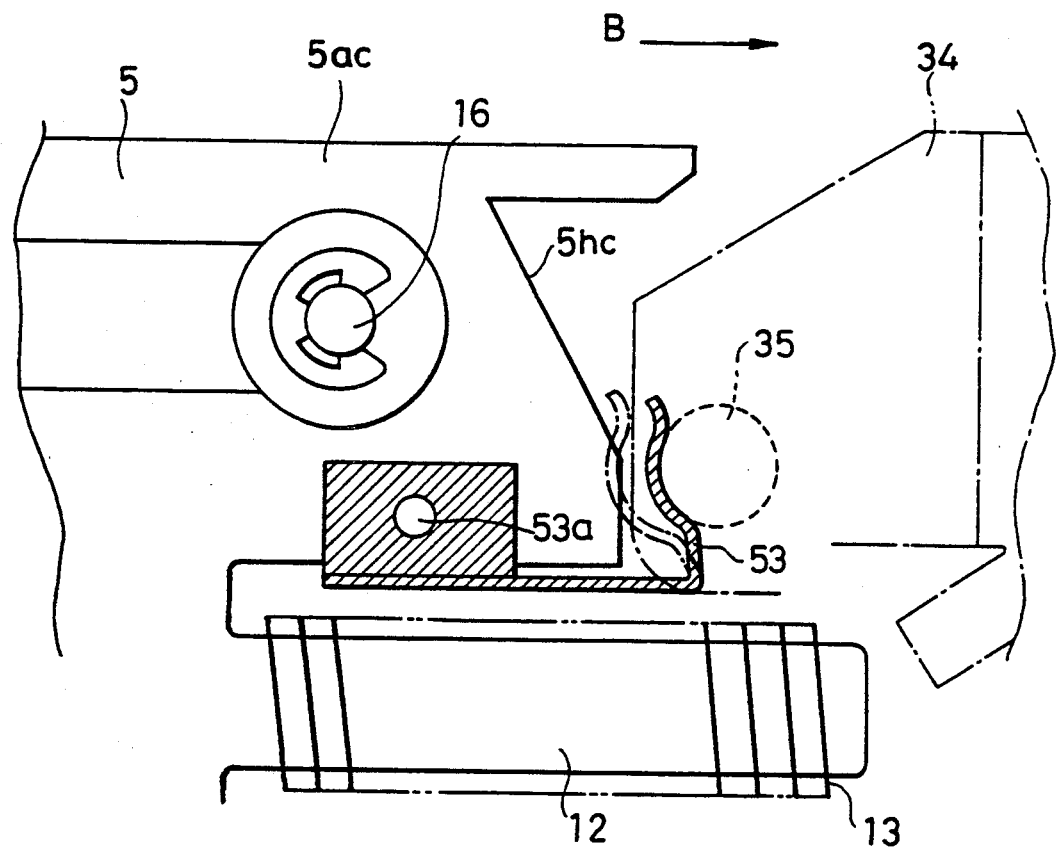
FIGS. 7A and 7B are a plan view and a side view, respectively, showing the projecting portion of a slide lever and its vicinities related in locking an operation button according to a fourth embodiment of the invention.
Figure 7B:
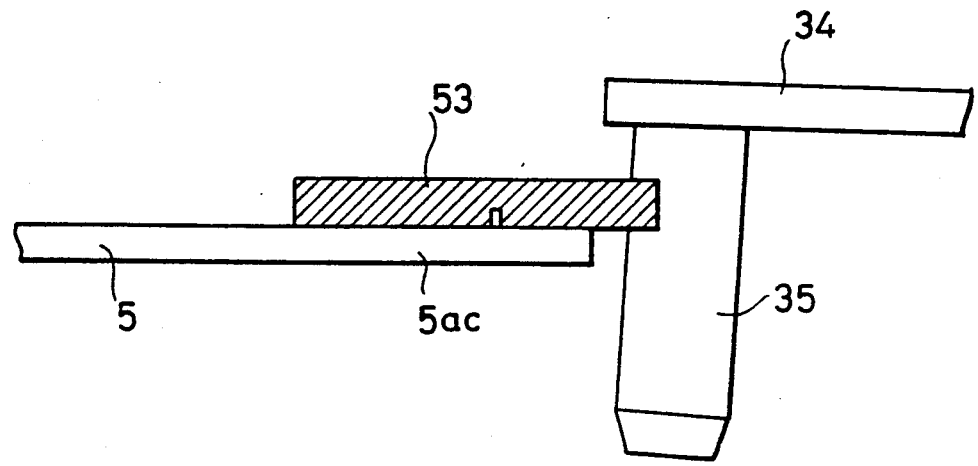

FIGS. 7A and 7B show a construction of a slide lever 5 according to the fourth embodiment of the invention. This embodiment has a modified construction of the third embodiment shown in FIG. 6. The slide lever 5 has a V-shaped groove 5hc similar to that for the third embodiment on its projection 5ac as well as a flat spring 53 on the projection 5ac. The flat spring 53 has a somewhat curved and substantially L-shaped end portion, which is located in face of the pin 35 of the locking plate 34 near the groove 5hc. The base end of the spring 53 is fixed on the projection 5ac of the slide lever 5 by caulking a pin 53a fixed on the flat spring 53 into a hole formed on the projection 5ac as shown in FIG. 6.

In the above-described construction, when the operation button 3 is locked, the curved end portion of the flat spring 53 is in contact with the locking pin 35 as shown by a solid line in FIG. 7A. In addition, the curved end portion of the flat spring may be a bit spaced from the pin 35. When a shock is given to the operation button 3 and is transmitted as the B-directed shock to the slide lever 5, the end portion of the flat spring 53 is flexed as shown by a long and short dash line and the slide lever 5 moves in the direction B. With a tip slope of the flat spring 53, the pin 35 is pushed upward in FIG. 7A, thereby rotating the locking plate 34 clockwise. And then, the pin 35 passes over the flat spring 53 and comes into contact with the edge of the groove 5hc. Along with the pin 35, the slide lever 5 can move toward the B direction until the pin 35 reaches the innermost edge of the groove 5hc.

With the foregoing construction of this embodiment, it can absorb an shock by the flat spring 53 more effectively than the third embodiment. In comparison with the second and third embodiments shown in FIGS. 5 and 6, this fourth embodiment is more advantageous in that the newly used flat spring 53 effects as a load only in locking the operation button, not in clamping a magnetic disc. This means that the operational force to the operation button 3 will not become large.

Fifth Embodiment

Figure 8A:
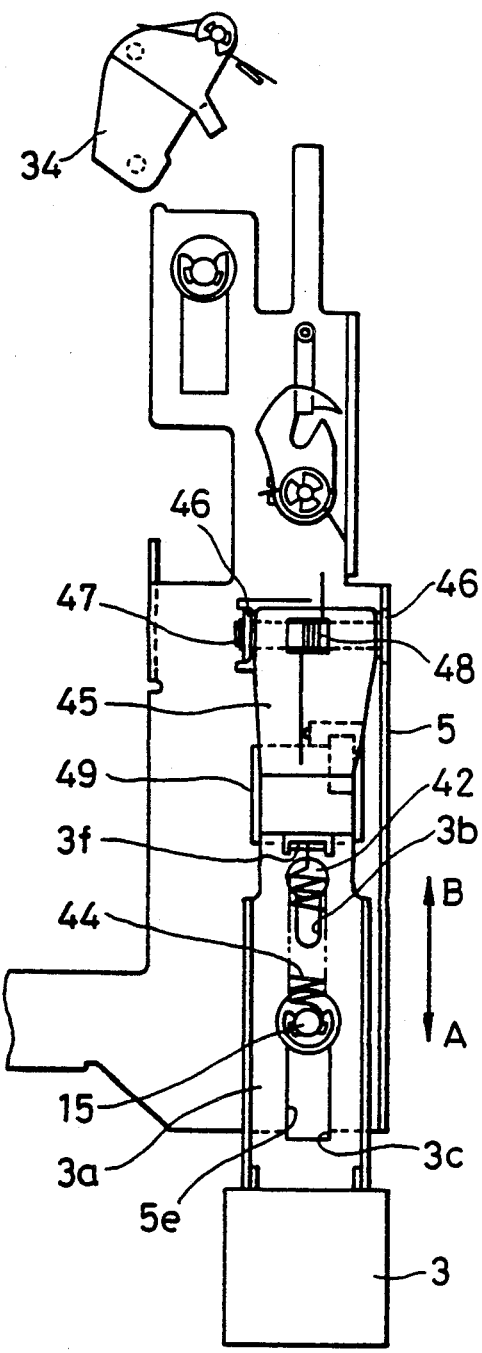
FIGS. 8A and 8B are a plan view and a right side view, respectively, showing construction and function of an operation button, and slide lever and their vicinities according to a fifth embodiment of the invention.
Figure 8B:
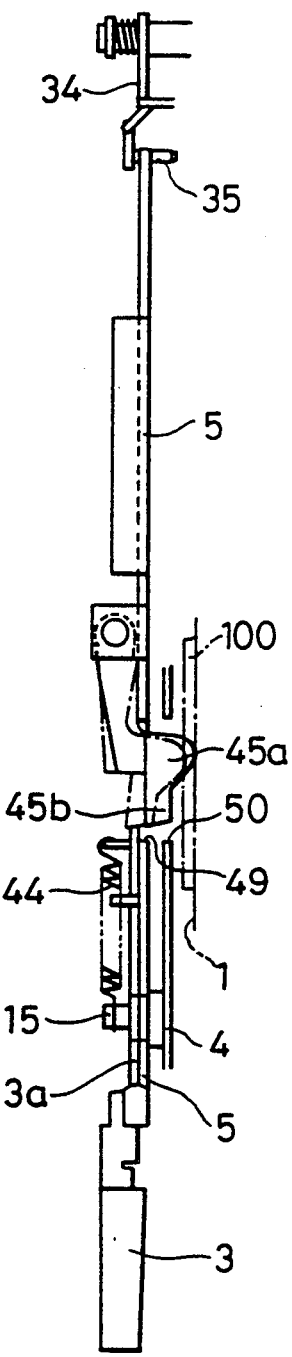

FIGS. 8A and 8B show a construction of an operation button, a slide lever and their vicinities used in a magnetic disc driver according to the fifth embodiment of the invention. Unlike the foregoing embodiments, this embodiment enables or disables an operation button function depending on the presence or absence of a magnetic disc to be inserted in place of a locking function for the operation button.

As shown in FIGS. 8A and 8B, in the present embodiment, an operation button 3 is not integrally fixed on a slide lever 5 and is made movable in A and B directions, like the first embodiment. That is, the operation button 3 contains a tabular leg portion 3a on which two slots 3b, 3c are formed along its longitudinal axis. A pin 15 planted on the base plate 4 is slidably fitted into a slot 3c through a cut-away portion 5e of the slide lever 5 and a pin 42 planted on the slide lever 5 is slidably fitted to the slot 3b. Hence, the leg portion 3a of the operation button 3 is connected onto the slide lever 5 in a manner to allow the leg portion 3a to slide with respect to the slide lever 5 in the A and B directions.

And, between the pin 15 and a spring peg 3f formed at the end of the leg portion 3a is bridged a spring 44, by which the leg portion 3a is biased with respect to the slide lever 5 in the direction A.

On the top middle portion of the slide lever 5 is provided a change-over lever 45 for switching enabling or disabling the operation button function depending on the presence or absence of an inserted magnetic disc 100. The lever 45 is opposed to the leg portion 3a of the operation button 3. The change-over lever 45 is rotatably supported on a shaft 47 bridged across a pair of projections 46, 46 standing on the slide lever 5, which projections are used as a bearing. Further, the change-over lever 45 is constantly biased downward by a torsion coil spring 48 elastically fitted around the shaft 47. As shown in FIG. 8B, the change-over lever 45 has a tip portion 45a curved downward and expanded forwardly and horizontally.

The slide lever 5 and the base plate 4 respectively provide openings 49 and 50 formed corresponding to the tip portion 45a of the change-over lever 45. The tip portion 45a of the change-over lever 45 is located in the openings 40 and 50, and the lower end of the tip portion 45a stays at such a position as permitting the lower end to come into contact with the magnetic disc 100.

The remaining construction of this embodiment is analogous to that of the first embodiment in FIGS. 1A and 1B.

With the foregoing construction of this embodiment, when a magnetic disc is not inserted into the disc driver, the tip portion 45a of the change-over lever 45 lowers to such a position as permitting itself to come into contact with the base 1 as shown by a solid line in FIG. 8B. The horizontally-expanded front end 45b of the change-over lever 45 is positioned to keep away from the end of the leg portion 3a of the operation button 3. When the operation button 3 is pushed in the direction B in this state, therefore, the leg portion 3a of the operation button 3 is slid on the slide lever 5 in the direction B, resulting in conveying only the force of the spring 44 to the slide lever 5. The force of the spring 44 is assumed to be smaller than a load given in the case of moving the slide lever 5 in the direction B. Under this assumption, if the operation button 3 is pushed in the direction B, the slide lever 5 is disallowed to move in the like direction. It means that the operation button function is disabled.

And, when an shock is given to the operation button 3 is a manner to push the button in the direction B, the leg portion 3a of the operation button 3 slides on the slide lever 5 in the direction B. During the button slide, the spring 44 serves to absorb the shock.

As shown by a long and short dash line in FIG. 8B, on the other hand, when a magnetic disc 100 is inserted into the disc driver, the magnetic disc 100 comes into contact with the lower end of the tip portion 45a of the change-over lever 45, thereby raising the change-over lever 45 as shown by a long and short dash line. it results in opposing the horizontally-expanded front end portion 45b to the end of the leg portion 3a of the operation button 3.

Under this state, pushing the operation button 3 in the direction B allows the leg portion 3a of the operation button 3 to come into contact with the front end portion 45b of the change-over lever 45 so that the pushing force against the operation button 3 is transmitted to the slide lever 5 through the change-over lever 45, thereby moving the slide lever in the direction B. That is, under this state, the operation button function is enabled. With the operation of the operation button 3, the slide lever 5 is moved so as to enable clamping the magnetic disc and loading the magnetic head as set forth above.

According to this embodiment, therefore, it is possible to avoid problems resulting from an erroneous operation of the operation button, because the operation button function is disabled when the magnetic disc 100 is not inserted into the disc driver. Herein, as stated above, the erroneous operation means that the operation button is operated when no disc is inserted into a disc driver. Further, in this state, the operation button 3 is exposed out of the disc driver, though, an external shock given to the operation button is absorbed so as to prevent the mechanisms contained in the disc driver from being damaged.

In addition, for disabling the operation button function until the magnetic disc 100 is inserted near the loading position, it is preferable to provide the change-over lever 45 at the far most of the slide lever 5.

The foregoing embodiments have described the mechanisms where a shock given to the operation button is absorbed and the function of the operation button is enabled or disabled. The mechanisms may be applied to not only a magnetic disc driver but also another disc driver, such as an optical disc driver.

Further, in the scope of the present invention is included a combination of either one embodiment of the first and the fifth embodiments and either one of the second to the fourth embodiments.

The foregoing drawings and descriptions are an illustration of the present invention, therefore, the invention is not limited to the foregoing embodiments. For example, the scope of claims in the invention covers several modifications in size, shape, and materials as well as function and details of components.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A disc driver for recording and/or reproducing information on and/or from a disc served as a recording medium, comprising;
    an operation button for operating said disc driver;
    locking means for locking said operation button when said disc is not inserted to said disc driver;
    lock-releasing means for releasing said lock accompanying with insertion of said disc; and
    absorbing means for absorbing a shock given to said operation button being locked by said locking means so as to inhibit the shock to be conveyed to said locking means.

2. A disc driver according to claim 1, wherein said absorbing means comprises;
    a leg portion extended at the lower end of said operation button;
    a sliding member being allowed to move with said leg portion for operating said disc driver in an unlocked state of said locking means and being disallowed to move with said locking means in a locked state thereof; and
    an elastic member bridged between said leg portion and said sliding member for absorbing a shock.

3. A disc driver according to claim 1, wherein said absorbing means comprises;
    a sliding member being allowed to move with the movement of said operation button for operating said disc driver in an unlocked state of said locking means and being disallowed to move with said locking means in a locked state thereof;
    a load member for providing a constant load to said sliding member under operation; and
    said sliding member further comprising at least one of an escape groove, a concave surface, and a curved surface formed on a peripheral surface of said sliding member facing to said locking means for allowing necessary displacement of said sliding member resulting from said shock.

4. A disc driver according to in claim 3, wherein said load member comprises;
    an elastic member having a leg portion fixed on said sliding member and a head portion removably engaging with a part of said locking means.

5. A disc driver according to claim 1, wherein said disc is either one of a magnetic disc, an optical disc, and a magneto-optical disc; and
    said locking means serves concurrently as said locking-releasing means and consists of a locking plate to be rotated in response to insertion of said disc and a torsion coil spring returning said locking plate to a predetermined position.

6. A disc driver according to claim 2, wherein said leg portion is tabular;
    said sliding member is a tabular slide lever with an arm used for its operation; and
    said elastic member is a spring.

7. A disc driver according to claim 3, wherein said load member consists of a spring.

8. A disc driver for recording and/or reproducing information on and/or from a disc served as a recording medium, comprising;
    an operation button for operating said disc driver;
    locking means for locking said operation button when said disc is not inserted to said disc driver;
    lock-releasing means for releasing said lock accompanying with insertion of said disc;
    a leg portion extending to the lower end of said operation button;
    a sliding member being allowed to slide with said leg portion for operating said disc driver in an unlocked state of said locking means and being disallowed to slide with said locking means in a locked state thereof;
    an elastic member bridged between said leg portion and said sliding member for absorbing an shock;
    a load member for providing a constant load to said sliding member being slid; and
    said sliding member further comprising at least one of an escape groove, a concave surface, and a curved surface formed on a peripheral surface of said sliding member facing to said locking means for allowing necessary displacement of said sliding member resulting from said shock in a locked state of said operation button.

9. A disc driver according to claim 8, wherein said load member comprises;
    an elastic member having a leg portion fixed on said sliding member and a head portion removably engaging with a part of said locking means.

10. A disc driver according to claim 9, wherein said elastic member included in said load member consists of a flat spring.

11. A disc driver for recording and/or reproducing information on and/or from a disc served as a recording medium, comprising;
    an operation button for operating said disc driver;
    change-over means for disabling a function of said operation button when said disc is not inserted and enabling said function in response to insertion of said disc;
    a sliding member having said change-over means mounted thereon and serving to transmit a force exerted on said operation button, said force being transmitted through said change-over means, to a disc-setting mechanism for setting said disc;
    a leg portion extending to the lower end of said operation button and being allowed to relatively slide with respect to said sliding member; and an elastic member for providing a force to said leg portion in a reverse direction to a direction of a shock given to said operation button.

12. A disc driver according to claim 11, wherein said elastic member is bridged between said leg portion of said operation button and a fixing member fixed in said disc driver.

13. A disc driver according to claim 11, wherein said change-over means is a change-over lever to be rotated in contact with said magnetic disc inserted into said disc driver.

14. A disc driver according to claim 11, wherein said disc-setting mechanism comprises a spindle for rotating said disc;
   a clamp section for clamping said disc; and
   a head-loading section for loading a recording and/or reproducing head onto said disc in response to the operation of said operation button.

* * * * *